May 19, 1936.  C. O. STROM  2,040,962
WEAR TESTING MACHINE
Filed July 21, 1933  3 Sheets-Sheet 1

Inventor:
Clifton O. Strom,
By
Attorney

May 19, 1936. C. O. STROM 2,040,962
WEAR TESTING MACHINE
Filed July 21, 1933 3 Sheets-Sheet 2
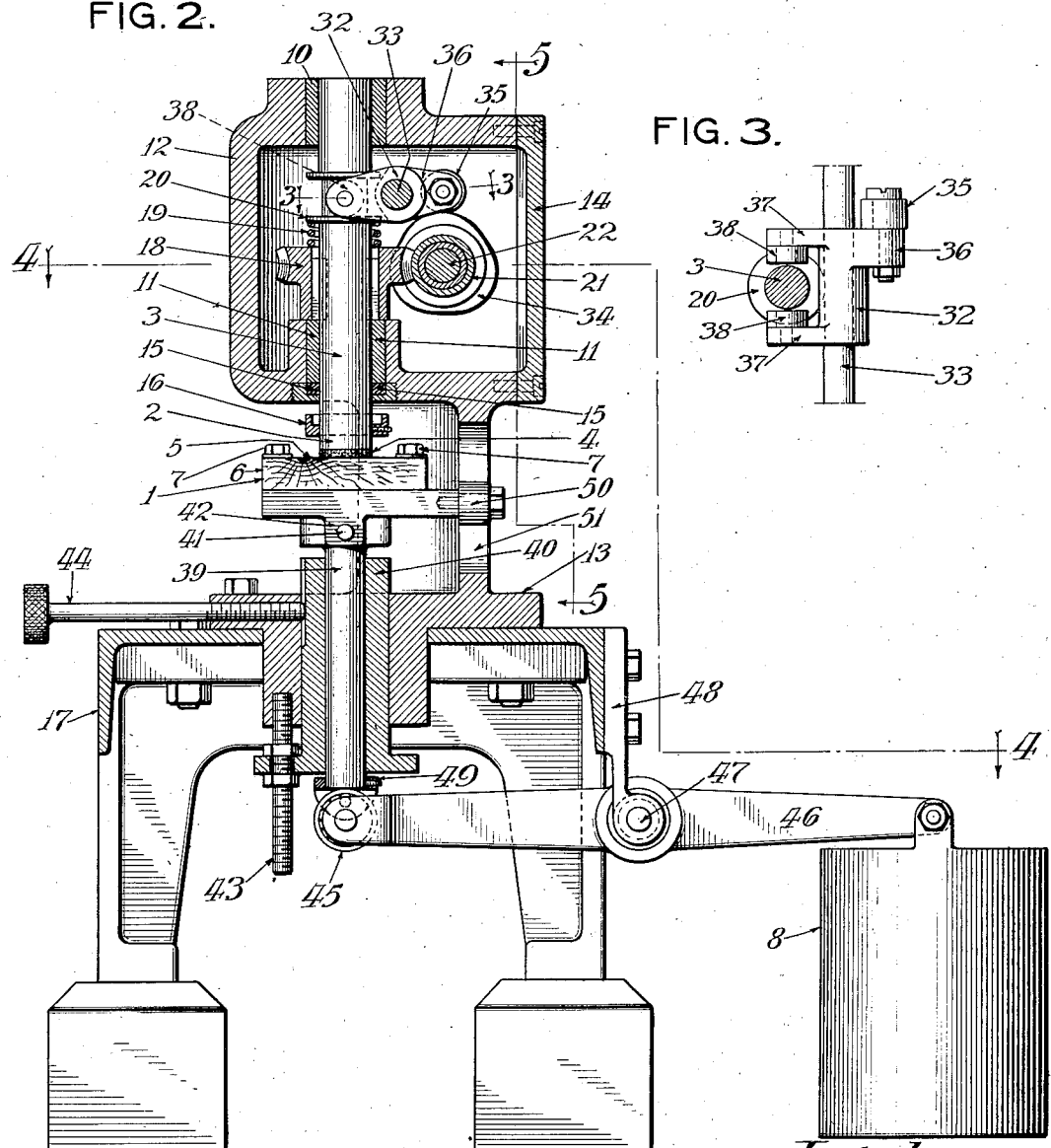
Inventor:
Clifton O. Strom,
B. H. Towers, Jr.
Attorney.

FIG. 4.
FIG. 5.
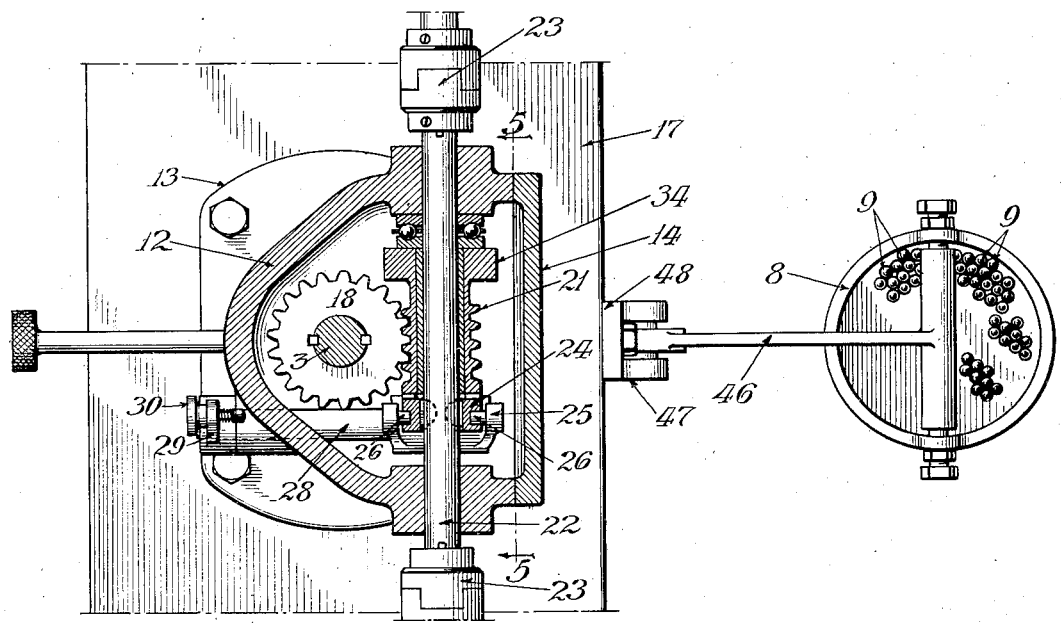
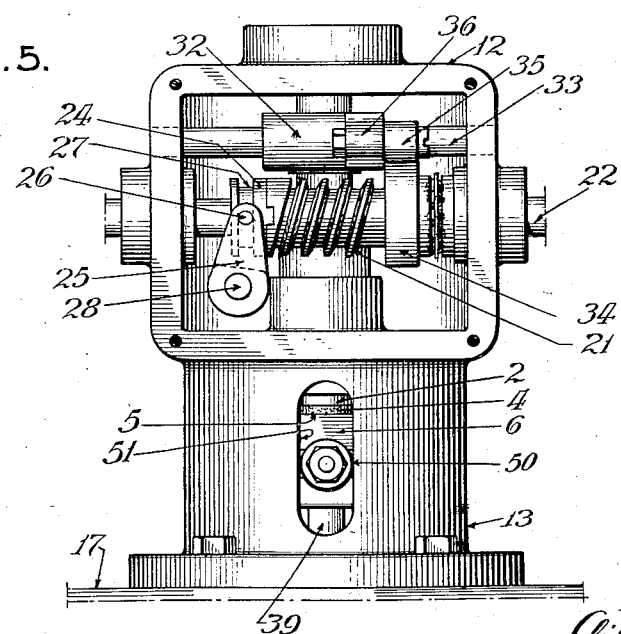

Patented May 19, 1936

2,040,962

UNITED STATES PATENT OFFICE 2,040,962

WEAR TESTING MACHINE

Clifton O. Strom, Racine, Wis.

Application July 21, 1933, Serial No. 681,468

7 Claims. (Cl. 73—51)

This invention relates to a wear testing machine for determining the wearing qualities or properties of various substances by subjecting the same to attrition.

The wear testing machine which the invention provides is ordinarily employed for testing the wearing qualities or properties of surface coatings or coverings such as wax, varnish, enamel, paint and linoleum.

The invention has an object to provide a wear testing machine which is accurate and efficient.

Another object is to provide a machine which will simulate this abrasive action to which the substance being tested is subjected during the ordinary use thereof.

Another object is to provide a wear testing machine which will simulate upon a surface coating or covering the abrasive action created by walking thereon.

Another object is to provide a wear testing machine which will subject a substance to intermittent and simultaneous friction throughout a fixed and given area thereof.

Another object is to provide a wear testing machine in which the pressure to apply the friction is regulatable within close limits.

Another object is to provide a wear testing machine which is simple in construction and which may be readily and economically manufactured.

The wear testing machine from the fundamental aspect of the invention therein is provided with a holder to carry the substance to be tested and a tool to subject the substance to attrition upon a fixed and given area thereof, one of said parts being reciprocable relative to the other part and one of said parts being rotatable relative to the other part and the rotatable part and the reciprocable part being actuated to apply intermittent and simultaneous friction throughout said area.

Numerous other objects and advantages of the invention will be apparent as it is better understood from the following description, which, when taken in connection with the accompanying drawings, discloses a preferred embodiment thereof.

The views in the drawings are as follows:

Fig. 2 is a vertical transverse section taken on the irregular line 2—2 of Fig. 1;

Fig. 3 is a detail view taken on the line 3—3 of Fig. 2;

Fig. 4 is a sectional plan view taken on the line 4—4 of Fig. 2;

Fig. 5 is a view taken on the line 5—5 of Fig. 4 and showing the machine in rear elevation with the cover plate removed to expose the driving mechanism.

Figure 1:
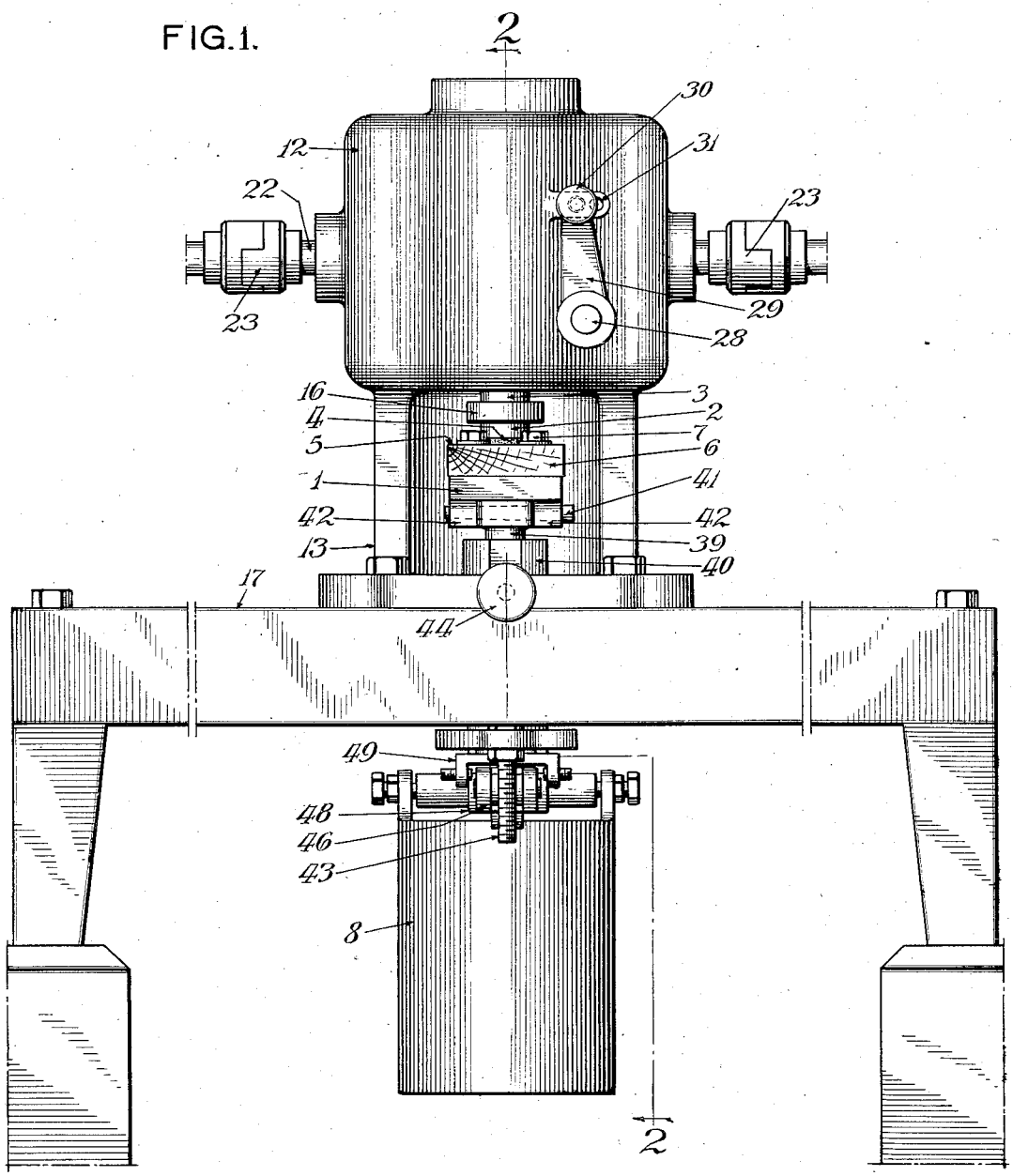
Fig. 1 is a front elevation of the wear testing machine.

The wear testing machine is provided with a holder 1 to carry the material or substance to be tested and with a tool 2 to apply intermittent friction under a given pressure upon a fixed and given area of the substance.

The tool 2 is carried by a rotary plunger 3 with which it is ordinarily formed integral and provided upon its lower end with a tip 4.

The tip 4 is made of a material which will produce an abrading action similar to that to which the substance to be tested is subjected during the ordinary use thereof.

The plunger 3 is arranged above the holder 1 to rotate and reciprocate upon a vertical axis and thereby move the tool 2 into and out of contact with the substance to be tested and to rotate it through a predetermined number of degrees while in contact therewith.

The machine is ordinarily employed to test the wearing qualities or properties of surface coatings or coverings such as wax, paint, varnish, and enamel, a specimen 5 of which is shown applied to the upper surface of a wooden test block 6 to be engaged by the tip 4 which is made of leather.

The block 6 is fastened to the holder 1 by bolts 7 and retained thereby in a stationary position relative to the holder 1.

The tip 4 is pressed against the coating 5 with a pressure corresponding to the weight of an average person and it is rotated through a given angle while in contact therewith to thereby simulate the abrading action to which a floor coating or covering is subjected by walking thereon.

For example, the tip 4 may exert a pressure of approximately 25 lbs. per square inch upon the coating 5 and be rotated through an angle of approximately 3° while in contact therewith.

The pressure exerted upon the coating 5 is determined by the weight of a counterweight 8 which supports the holder 1.

The plunger 3 moves the tip 4 into contact with the coating 5 and then it depresses the holder 1 and thereby raises the counterweight 8.

The counterweight 8 is ordinarily a hollow receptacle containing individual weights 9 such as small shot the number of which may be increased or decreased to vary the weight of the counterweight and thereby vary the pressure exerted upon the coating 5 by the tool 2.

The angle through which the tip rotates while in contact with the coating 5 may be varied by adjusting the machine to vary the time interval during which the tip 4 is in contact with the coating 5 or by modifying the machine to vary the rate of rotation of the plunger 3 relative to the rate of reciprocation thereof.

The plunger 3 is arranged to rotate and reciprocate in an upper bearing 10 and in a lower bearing 11 carried, respectively, by the upper and lower walls of a closed casing 12 which is arranged upon the upper end of a frame 13 and closed at its rear by a cover 14.

The lower bearing 11 is provided with a packing 15 which is closely fitted around the plunger 3 to prevent lubricant from dripping upon the test block 6, and any small quantity of lubricant which might be carried past the packing 15 by the plunger 3 during reciprocation thereof is collected in a receptacle 16 which is closely fitted upon the plunger 3 and attached thereto to move therewith.

The frame 13 is carried by a support or table 17 which ordinarily carries other similar testing machines in alinement therewith in order that several machines may be driven from a common source of power.

The plunger 3 is rotated by a worm wheel or screw gear 18 which is splined thereon and retained in engagement with the top of the bearing 11 by a helical compression spring 19 arranged between the top of the worm wheel 18 and a collar 20 fixed upon the plunger 3.

The worm wheel or screw gear 18 meshes with a worm or screw 21 which is carried by a drive shaft 22 having a bearing in each of the lateral side walls of the casing 12.

The drive shaft 22 is provided upon each of its ends with a coupling 23 to connect it to a source of power to be driven thereby or to connect it to an adjacent testing machine to be driven in unison therewith.

The worm 21 is ordinarily driven by the shaft 22 through a jaw clutch 24 which is splined upon the shaft to engage the worm 21 and connect it to the shaft to be driven thereby.

The clutch 24 is operated by a bifurcated clutch lever 25 which has a pin 26 arranged in each side of its bifurcated end and extending into a groove 27 formed in the clutch.

The clutch lever 25 is fixed at its other end upon the inner end of a clutch shaft 28 which extends through the front wall of the casing 12 and has a bearing therein.

The clutch shaft 28 is provided upon its outer end with an operating lever 29 by means of which the clutch 24 may be moved into and out of engagement with the worm 21.

The lever 29 is provided at its free end with a knob 30 having a suitable pin extending from the rear side thereof to engage one or the other of two holes 31 which are formed in the front of the casing 12 to keep the clutch 24 either engaged with the worm 21 or disengaged therefrom.

The plunger 3 is urged downward by a lever 32 carried by a shaft 33 which is supported at each end thereof by a side wall of the casing 12.

The lever 32 is rocked upon or with the shaft 33 by a cam wheel 34 which is carried by the worm 21 to rotate therewith.

The cam wheel 34 has its periphery in engagement with a roller 35 which is carried by the lever 32 upon the end of a rear arm 36 thereof.

The lever 32 is provided with two front arms 37 which are spaced from each other and extend upon opposite sides of the plunger 3 immediately above the collar 20.

The front arms 37 are each provided upon the inner face thereof with a roller 38 to engage the top of the collar 20.

The plunger 3 is urged upward by the spring 19 which keeps the collar 20 in engagement with the rollers 38 and thereby keeps the roller 35 in engagement with the cam wheel 34.

When the clutch 24 is engaged and the drive shaft 22 is rotated, the cam wheel 34 will raise the roller 35 and thereby depress the plunger 3 during one part of a revolution of the drive shaft and will permit the spring 19 to raise the plunger during another part of a revolution of the drive shaft.

The cam wheel 34 shown in the drawings is shaped to rock the lever 32 three times during each revolution of the drive shaft and thereby cause the plunger 3 to be reciprocated three times during each revolution of the drive shaft.

The downward movement of the plunger 3 first brings the tip 4 into engagement with the block 6 and then the plunger 3 moves the block 6 and the holder 1 downward against the resistance of the counterweight 8.

The holder 1 is supported by a vertical post 39 which is fitted in a sleeve 40 to reciprocate therein and has its upper end connected by a pin 41 to two flanges 42 which are carried by the holder 1 upon the underside thereof and arranged upon opposite sides of the post 39.

The sleeve 40 extends through the bottom of the frame 13 and is vertically adjustable therein to vary the interval during which the tip 4 is in contact with the block 6.

The sleeve 40 is adjusted vertically by an adjusting screw 43 and is restrained from rotation by a set screw 44 which is threaded through the base of the frame 13 into engagement with the sleeve 40.

The post 39 is supported at its lower end upon a roller 45 carried by one end of a counterweight lever 46 which supports the counterweight 8 at the other end thereof and is pivoted intermediate its ends upon a pin 47 carried by a bracket 48 attached to the support 17.

The counterweight 8 exerts through the lever 46 and the roller 45 a constant upward force upon the post 39 which is limited in its upward movement by a stop collar 49 fixed upon its lower end to engage the bottom of the sleeve 40.

When the plunger 3 moves the holder 1 downward, it exerts upon the coating 5 a pressure proportional to the weight of the counterweight 8 and at the same time it rotates the tip 4 and thereby subjects the coating 5 to simultaneous friction throughout a fixed and given area thereof during the brief interval that the tip 4 is in contact therewith.

The friction applied to the coating 5 by the tip 4 tends to rotate the holder 1 but is prevented from doing so by a roller 50 which is carried by the holder 1 upon the rear side thereof and arranged in a vertical slot 51 formed in the rear wall of the frame 13.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

The invention is hereby claimed as follows:

1. A wear testing machine, comprising a holder to carry the substance to be tested, a tool to engage said substance upon a fixed given area thereof, means to rotate said tool and simultaneously reciprocate the same into and out of engagement with said substance to subject it to intermittent friction throughout said area, and means to vary the time said tool is in engagement with said substance during each reciprocation of said tool.

2. A wear testing machine, comprising a holder to carry the substance to be tested, yieldable means to support said holder, a tool to engage said substance upon a fixed given area thereof, means to rotate said tool and simultaneously reciprocate the same into and out of engagement with said substance to subject it to intermittent friction throughout said area and to intermittently depress said holder against the resistance of said yieldable means, and means to vary the resistance of said yieldable means.

3. A wear testing machine, comprising a holder to carry the substance to be tested, yieldable means to support said holder, a tool to engage said substance upon a fixed given area thereof, means to rotate said tool and simultaneously reciprocate the same into and out of engagement with said substance to subject it to intermittent friction throughout said area and to intermittently depress said holder against the resistance of said yieldable means, means to vary the resistance of said yieldable means, and means to vary the time said tool is in engagement with said substance during each reciprocation of said tool.

4. A wear testing machine, comprising a holder to carry the substance to be tested, yieldable means to support said holder, a tool to engage said substance upon a fixed given area thereof, means to rotate said tool and simultaneously reciprocate the same into and out of engagement with said substance to subject it to intermittent friction throughout said area and to intermittently depress said holder against the resistance of said yieldable means, and means to vary the distance said holder is depressed by said tool to thereby vary the time said tool is in engagement with said substance during each reciprocation of said tool.

5. A wear testing machine, comprising a holder to carry the substance to be tested, yieldable means to support said holder, a tool to engage said substance upon a given area thereof and subject the same to attrition, a drive shaft connected to said tool to rotate the same, a cam carried by said shaft to rotate therewith, and a lever operated by said cam to intermittently advance said tool into engagement with said substance and thereby subject it to intermittent friction throughout said area.

6. A wear testing machine, comprising a holder to carry the substance to be tested, yieldable means to support said holder, a tool to engage said substance upon a given area thereof and subject the same to attrition, a drive shaft connected to said tool to rotate the same, a cam carried by said shaft to rotate therewith, a lever operated by said cam to intermittently advance said tool into engagement with said substance and thereby subject it to intermittent friction throughout said area, and means to vary the time interval said tool is in contact with said area.

7. A wear testing machine, comprising a holder to carry the substance to be tested, a counterweight to support said holder, a tool to engage said substance upon a given area thereof and subject the same to attrition, a drive shaft connected to said tool to rotate the same, a cam carried by said shaft to rotate therewith, and a lever operated by said cam to intermittently advance said tool into engagement with said substance and thereby subject it to intermittent friction throughout said area.

CLIFTON O. STROM.